United States Patent
Jónsson et al.

(10) Patent No.: US 10,451,341 B2
(45) Date of Patent: Oct. 22, 2019

(54) COMPUTER-IMPLEMENTED METHOD OF MONITORING THE OPERATION OF A CARGO SHIPPING REEFER CONTAINER

(71) Applicant: MAERSK LINE A/S, Copenhagen (DK)

(72) Inventors: Ragnar Ingi Jónsson, Copenhagen (DK); Morten Juel Skovrup, Vipperød (DK); Rabia Line Bonding Granlund, Valby (DK); Thierry Seurin, Copenhagen (DK); Rasmus Solmer Eriksen, Copenhagen (DK); Morten Rene Baerentz, Copenhagen (DK)

(73) Assignee: MAERSK LINE A/S, Copenhagen (DK)

( * ) Notice: Subject to any disclaimer, the term of this patent is extended or adjusted under 35 U.S.C. 154(b) by 47 days.

(21) Appl. No.: 14/915,521

(22) PCT Filed: Aug. 29, 2013

(86) PCT No.: PCT/EP2013/067915
§ 371 (c)(1),
(2) Date: Feb. 29, 2016

(87) PCT Pub. No.: WO2015/028072
PCT Pub. Date: Mar. 5, 2015

(65) Prior Publication Data
US 2016/0216028 A1    Jul. 28, 2016

(51) Int. Cl.
*G06F 19/00*    (2018.01)
*F25D 29/00*    (2006.01)
(Continued)

(52) U.S. Cl.
CPC ......... *F25D 29/003* (2013.01); *B65D 88/745* (2013.01); *F25D 11/003* (2013.01);
(Continued)

(58) Field of Classification Search
CPC combination set(s) only.
See application file for complete search history.

(56) References Cited

U.S. PATENT DOCUMENTS

2005/0075899 A1*  4/2005  Corcoran ............... G06Q 10/08
                                                   705/331
2005/0268625 A1   12/2005  Sienel et al.
(Continued)

FOREIGN PATENT DOCUMENTS

CN    1781006 A    5/2006
CN    1965201 A    5/2007
(Continued)

OTHER PUBLICATIONS

International Preliminary Report on Patentability received for PCT Patent Application No. PCT/EP2013/067915, dated Dec. 11, 2015, 8 pages.
(Continued)

*Primary Examiner* — Kidest Bahta
(74) *Attorney, Agent, or Firm* — Morrison and Foerster LLP

(57) ABSTRACT

Techniques for remotely monitoring the operation of a cargo shipping reefer container configured with a refrigeration system that has installed therewith a control computer coupled with sensors monitoring the operation of the refrigeration system include: collecting a first and second set of observation data comprising a respective first and second sequence of measurement values measured by sensors coupled to the control computer; running a simulation model that receives the first set of observation data as input and outputs simulated values; the simulation model is configured to output the simulated values as estimates of the second set of the observations; computing an indicator value as a function of residual values computed from the difference between the values of the second set of observations and the
(Continued)

simulated values; and evaluating the indicator value against a predefined criterion and issuing an alarm signal in case the predefined criterion is exceeded.

20 Claims, 5 Drawing Sheets

(51) Int. Cl.
*F25D 11/00* (2006.01)
*B65D 88/74* (2006.01)
*G05B 17/02* (2006.01)

(52) U.S. Cl.
CPC .......... *F25D 29/008* (2013.01); *G05B 17/02* (2013.01); *F25D 2500/04* (2013.01)

(56) References Cited

U.S. PATENT DOCUMENTS

| | | | |
|---|---|---|---|
| 2006/0191282 A1 | 8/2006 | Sekiya et al. | |
| 2008/0231459 A1* | 9/2008 | Corder | G07C 5/008 340/572.7 |
| 2010/0161254 A1* | 6/2010 | Atlas | G01H 1/00 702/56 |
| 2011/0193710 A1* | 8/2011 | McIlvain | B60P 3/20 340/585 |
| 2012/0330596 A1* | 12/2012 | Kouznetsov | G01N 33/0006 702/104 |
| 2013/0030725 A1* | 1/2013 | Friedlander | G01H 1/12 702/56 |

FOREIGN PATENT DOCUMENTS

| | | |
|---|---|---|
| EP | 2546589 A1 | 1/2013 |
| JP | 2004-309015 A | 11/2004 |

OTHER PUBLICATIONS

International Search Report and Written Opinion received for PCT Patent Application No. PCT/EP2013/067915, dated Jun. 2, 2014, 10 pages.

Office Action received for Chinese Patent Application No. 201380079904.1, dated Jun. 28, 2017, 23 Pages (14 pages of English Translation and 9 pages of Official Copy).

\* cited by examiner

COMPUTER-IMPLEMENTED METHOD OF MONITORING THE OPERATION OF A CARGO SHIPPING REEFER CONTAINER

CROSS-REFERENCE TO RELATED APPLICATION

This application is a U.S. National Stage patent application of PCT/EP2013/067915, filed on Aug. 29, 2013, the entire contents of which are incorporated herein by reference.

BACKGROUND OF THE INVENTION

Remote monitoring of cargo shipping reefer containers is a relatively new technical field. In connection with remote monitoring, cargo shipping reefer containers are configured with a refrigeration system that has installed therewith a control computer coupled with sensors monitoring the operation of the refrigeration system. Cargo shipping reefer containers typically conform to the ISO standard and are also denoted reefer ISO-containers.

An ISO-container is an article of standardized transport equipment which is very widely used in commercial transport. Typically, ISO-containers have lengths of 20, 40 or 45 feet and have standard fittings that can be used for attachment to vehicles and for stacking on-board carriers. Most ISO-containers have a unique combination of letters/numbers that enable unique identification thereof.

Many of the containers are reefer containers that are provided with a refrigeration system or an environment regulating system configured for keeping the cargo at a set temperature and/or humidity—often within quite narrow tolerances. For instance, a 40 ft container is usually constructed with a 38 ft cargo space and a 2 ft refrigeration apparatus.

Today, more than about 90% of international cargo is transported in containers. The containers carry cargo literally all over the world, from the southernmost regions to the northernmost regions and vice versa. A large part of that cargo is in the form of foodstuffs that are transported for many days from one part of the world to another. The qualities of the foodstuffs that arrive at their destination following transport in containers depend to a very high degree on the efficiency and performance of the refrigeration or environment regulating system. If a refrigeration system or an environment regulation system breaks down during transport of the cargo, the cargo will usually be ruined when it arrives at its destination.

Conventionally, the cargo business has accepted this state of affairs due to it being impossible, from a technical point of view, to provide reliable monitoring systems that function in the very diverse situations to which a refrigeration container and the refrigeration and environment regulating systems are exposed. For instance, the container may be subject to widely varying ambient temperatures and widely differing humidity levels. The temperature of the cargo as such may vary a lot, and so may the nature of the cargo.

BRIEF SUMMARY OF THE INVENTION

There is provided a computer-implemented method of remotely monitoring the operation of a cargo shipping reefer container configured with a refrigeration system that has installed therewith a control computer coupled with sensors monitoring the operation of the refrigeration system. The method comprises:

collecting, from the control computer, a first set of observation data and a second set of observation data comprising a respective first and second sequence of measurement values measured by sensors coupled to the control computer;

running a simulation model that receives the first set of observation data as its input and outputs simulated values; wherein the simulation model is configured to output the simulated values as estimates of the second set of the observation data;

computing an indicator value as a function of residual values computed from the difference between the values of the second set of observation data and the simulated values; and evaluating the indicator value against a predefined criterion and issuing an alarm signal in case the predefined criterion is exceeded.

Consequently, cost and especially energy consumption in connection with conventional pre-trip inspections (PTIs) can be significantly reduced. Conventional pre-trip inspections involve typically a 30 minutes to 7 hours test-run of the reefer container to test that its refrigeration or climate control unit operates as it should. The conventional pre-trip inspection requires manpower to initiate the inspection and monitor the outcome of the inspection. During such pre-trip inspection the refrigeration or climate control unit is exposed to a so-called stress-test where maximum cooling and maximum heating is performed. This is a very energy consuming exercise.

However, remotely monitoring the operation of a cargo shipping reefer container according to the present method significantly reduces cost and especially energy consumption in connection with those conventional pre-trip inspections. It is possible to skip pre-trip inspection for an upcoming trip when no alarms were raised or reported during a preceding trip and only perform pre-trip inspection when an alarm was raised or reported or when less frequent general maintenance is scheduled.

Also, there is provided a method which establishes a reliable and robust reference value for deciding whether a technical fault or malfunction has occurred in the refrigeration system of the cargo shipping reefer container.

The reference value adapts to the operating conditions currently experienced by the reefer container in question. Thereby, it is possible to reliably and robustly decide whether a technical fault or malfunction has occurred under varying operating conditions of the refrigeration system. This is a great advantage since a cargo shipping reefer container can be on a long trip under varying humidity and temperature conditions. Also, it is valuable to be able to report that an alarm signal was not issued since this means that cargo e.g. produce was transported under normal operating conditions.

In the industry for cargo shipping reefer containers it is conventionally considered impossible to establish such a reliable reference. However, given such a reliable reference it is now possible to provide automatic (non-supervised) surveillance of cargo shipping reefer containers and thus to use such a system for surveillance of containers in large numbers. This is a highly desired step forward i.a. in terms of preserving food quality of transported produce such as vegetables and fruit.

The input to the simulation model comprises measurement values measured by sensors coupled to the control computer of the container in question from wherever it may be located. In this way the simulation model receives information on the current operating conditions of the refrigeration system in the container in question and uses that information to adapt to those current operating conditions. The sequence of measurement data may be transmitted in data packets e.g. a data packet transmitted at regular or semi-regular intervals e.g. every 20 minutes, every 30 minutes or every hour or at other intervals. Each data packet may have a time stamp and comprise a set of observation data e.g. with a measured value of temperature and pressure. The sequence of measurement values is thereby distributed across packets. It may happen that packets of observation data fail to arrive or arrive in reverse order.

In some embodiments the simulation model is configured such that the output of the simulation model correlates to a relatively high degree with the values of the second set of observations when the refrigeration system is in a non-faulty operating state. On the contrary, it correlates to a relatively low degree when the refrigeration system is in a faulty state. Thus, with the adaptation to those current operating conditions, the simulation model establishes, by its output, reference values that mimic the second set of observations as received from the control computer and measured in the container when the refrigeration system is in a non-faulty operating state. That is, in a non-faulty operating state, the output of the simulation model correlates to a relatively high degree with the values of the second set of observations. In that state the residual values statistically tend to have a zero or close-to-zero mean.

When a faulty operating state occurs, the residual values tend to change their statistical properties. This is used to detect a fault when the residuals have change consistently for a while.

As a result, the alarm signal is issued in a reliable manner i.e. when there is a technical fault in the refrigeration system rather than a change in operating conditions, which could result from a gradually falling compressor pressure measured in the refrigeration system of a reefer container travelling north from equator.

In some embodiments the rate of the change of the indicator value and the thresholds of the predefined criterion are adjusted such that the alarm gives an early warning of faults, well before the fault causes damages to the produce or cargo in the reefer container (as far as possible).

The alarm signal can be in the form of a visual indicator in a report for a single container or for a group of containers or for a group of containers in respect of which an alarm signal is issued. In some embodiments there is prepared a report comprising a presentation of all or a subset of the observation data and/or the indicator value. Such a report may also comprise a presentation of whether an alarm signal was issued and when that happened or that an alarm signal was not issued. Such a report may serve as a documentation of the conditions under which the cargo in the container was stored or transported. This is a great advantage in terms of quality control.

In some embodiments the simulation model is configured with different states that enable the model to distinguish between several states and detect one or more of them. The model may distinguish between several faulty states and/or several non-faulty states. The alarm signal may include information about a detected state to improve the level of information given in the alarm signal.

In some embodiments the indicator value comprises computing a cumulative value of the residuals. The cumulative value can be computed in various ways e.g. by simply accumulating the residuals over time where positive residual values increases the cumulative value and where negative residuals decreases the cumulative value. In some embodiments computing the cumulative value comprises computing a logarithmic likelihood ratio between an estimate of the probability that a residual value is a fault and an estimate of the probability that a residual value is a normal situation i.e. not a fault.

In some embodiments two or more residuals e.g. suction pressure and discharge pressure residuals are combined e.g. by addition or linear combination into a combined residual. Thereby it is possible to tune the residual computation to have a desired sensitivity to particular fault conditions and to reduce the probability of erroneous fault detections. In some embodiments at least some of the residuals are computed from a mathematical expression describing a relation between parameters.

In some embodiments the method comprises collecting preset values, from a database, that define settings for the refrigeration system of the reefer container and/or features of the reefer container and/or properties of the cargo; and inputting the preset values to the simulation model for its estimation of the second set of observations. Thereby the simulation model receives input representing the conditions the refrigeration system is operating under. Consequently, the simulation model operates on data acquired online from a respective cargo shipping reefer container and additionally on preset values that carries metadata information about the container, its load or current configuration. This greatly improves the accuracy of the simulation model and thus the robustness of the method.

The settings may include temperature setpoints i.e. a predefined, set temperature that the reefer aims to maintain for the cargo. The features of the reefer container may include physical properties such as size of the container, e.g. its length, its level of thermal insulation or the capacity, limits of the refrigeration system and/or the type of reefer unit. The properties of the cargo may include e.g. its weight, respiratory heat production and specific heat capacity.

In some embodiments the preset temperature value is entered by a human operator via a control panel (user interface) accessible at or on the physical container. The control computer then transmits the preset value to a simulation server. In other embodiments the preset value is entered via a container management system and then communicated to the control computer and the simulation server.

In some embodiments the preset values that are input to the simulation model comprise:
  a preset temperature value that defines a temperature the refrigeration system is set to obtain for the cargo; and
  a cargo property value that defines thermo-dynamic properties of the cargo.

The preset temperature value (often designated $T_{setpoint}$) is input to the simulation model e.g. via transmission on a data network from the control computer to a simulation server computer or via a data network from a container management system server computer.

In some embodiments the preset temperature value is a parameter of a temperature profile that defines a temperature as a function of time lapsed from about loading the container to an estimated time of unloading the container.

The thermo-dynamic properties of the cargo comprise properties such as weight of the cargo, respiration heat of the cargo, heat capacity of the cargo or specific heat of the cargo. These properties have shown to play a significant role in providing a reliable reference for deciding whether a fault state has occurred.

In some embodiments the type of refrigeration unit is also input to the simulation model. Thereby, the simulation model takes the type of refrigeration unit into account and provides more accurate estimations.

In some embodiments the first set of observation data that is collected from the control computer and input to the simulation model comprises:
a measured temperature value that is an estimate of an ambient temperature for the cargo shipping reefer container; and/or
a measured volume that is an estimate of the volume of fresh air intake for the cargo shipping reefer container.

The measured temperature value is sometimes denoted $T_{ambient}$ and the measured volume of fresh air intake is sometimes denoted $V_{fresh\_air}$. Both parameters are measured at or in the reefer container via the control computer thereof.

The ambient temperature enables the simulation model to estimate the parameters of the refrigeration system that are dependent on ambient conditions such as the expected discharge pressure.

The measured volume of fresh air intake enables the simulation model to take the fresh air intake into account when estimating a parameter expressing how much the refrigeration system is loaded.

In some embodiments the second set of observation data that is collected from the control computer and compared to output of the simulation model comprises a first temperature value and a second temperature value that are measured in an air flow flowing through an evaporator of the refrigeration system.

In some embodiments the first temperature value is a supply air temperature (often designated $T_{supply}$) and the second temperature value is a return air temperature (often designated $T_{return}$). They represent the temperature of air supplied from the refrigeration system to the cargo in the container, respectively, the temperature of the air returned back from the cargo as a result of circulating air through the cargo area of the container.

Alternatively, probe temperatures may be used where temperature probes are installed in the cargo (e.g. among piece of fruit or vegetables) and transmits temperature measurements to the control computer.

In some embodiments the second set of observation data that is collected from the control computer and compared to output of the simulation model comprises a first pressure value and a second pressure value that are measured with respect to a compressor in the refrigeration system.

A compressor is a component of a conventional refrigeration system and is a component in a circuit circulating a refrigerant. The compressor has an inlet for the refrigerant and an outlet at which the first and second pressure values are respectively measured. The first and second pressure values are often designated $P_{suction}$ and $P_{discharge}$, respectively.

In some embodiments the method comprises performing a smoothening filter operation on the first sequence of measurement values prior to being input for the simulation model.

It has been discovered that a smoothening filter operation that reduces the statistical variance of the measurement values better matches the physical behaviour of the measured properties and makes the simulation model perform better. This is desired as it improves the robustness of the simulation model and improves its ability to run as an unsupervised model.

In some embodiments a smoothening filter operation is performed at a server computer, where the simulation model is run or at a controller with the reefer before the measurements are transmitted to the server.

In some embodiments the method comprises:
processing a sequence of measurement values to estimate a level of the measurement values and/or a change in level;
comparing the estimated level and/or change in level to a predetermined criterion; and
issuing an alarm signal in case the predefined criterion is exceeded.

Thereby immediately apparent fault situations can be detected in a reliable and simple manner without overloading the simulation model. Such monitoring of the data can identify immediately apparent deviations from a setpoint either in terms of the magnitude of difference between a measurement and a setpoint or in terms of the measurement values moving away from the setpoint. In the latter case, an alarm signal is issued when the difference is not moving in the right direction, towards the setpoint.

Thus the simulation model catches fault states that occur after showing a gradually increasing, deviating operation. The monitoring of the data catches fault states that on a shorter term can be identified as fault state since thresholds representing normal operating conditions are exceeded or since a measured value develops with a trend away from a target value within normal operating conditions. The monitoring also serves as a remote monitoring of the operation of the refrigeration system or the control computer installed therewith. Thus, in case an alarm signal is raised by these monitoring steps, it may be coded with information showing this condition.

In some embodiments the monitoring rejects data before entering the simulation model or disables running of the simulation model in input data while or in case the predefined criterion is exceeded. Thereby, the robustness of the system is improved.

In some embodiments the alarm signal is raised as a result of the monitoring and the alarm signal is coded to indicate how it occurred. It may be coded with different text codes and/or colour codes and/or graphical symbols when shown in a report display.

In some embodiments the simulation model has a first mode, which is a default mode and a second selectable mode; the method comprising:
processing a sequence of measurement values to estimate a level of the measurement values and/or a change in level;
comparing the estimated level and/or change in level to a predetermined criterion; and
selecting the second mode when the predefined criterion is exceeded.

The first mode may comprise running a differential equation model or a transient model. The second mode may comprise running a static model. The first mode is thus selected when the simulation model operates on data in a transient phase while the system operates to approach some target value e.g. a set point temperature.

In some embodiments the method comprises:
preparing the simulation model for an ensuing period of simulation in response to detection of an ensuing trip of the reefer container; wherein an ensuing trip of the reefer container is detected as a pause of a predetermined length within which observation data from the respective reefer container has not been received followed by further observation data.

The predetermined period may have a duration of e.g. 10 hours, 16 hours, 24 hours or another duration.

In some embodiments the method comprises:

processing a sequence of measurement values to estimate a level of the measurement values and/or a change in level;

comparing the estimated level and/or change in level to a predetermined criterion; and disabling issuing of the alarm signal while the predetermined criterion is exceeded.

Such a stable state detector is applied to make sure that an alarm issues only if those values input to the simulation model or to be compared to simulated values have reached a stable state. Typically, such a stable state follows a transient response that occurs due to e.g. activation or start-up of the refrigeration system, loading of the reefer container or like sudden events. Thus, in such a situation the measured values may be in range of a normal operating state, but for instance following loading of the reefer container it may take some time before the refrigeration system has settled and maintains the temperature at or close to a predetermined level. The stable state detector disables the running of the simulation model, resets the simulation model, its output or the cumulative value; inhibits the cumulative value from cumulating while the predetermined criterion is exceeded or otherwise disables issuing of the alarm signal while the predetermined criterion is exceeded.

If e.g. a reefer is in a state where it cools down produce in the reefer there will be observed large differences between measured values and the corresponding ones output from the simulation model while the produce is being cooled down. When the produce is cooled down the differences will assume smaller values unless there is a fault state.

In some embodiments the method comprises:

receiving a sign-in signal, from the control computer, indicating that the cargo shipping reefer container signs in to a fault monitoring programme, receiving a sign-out signal, from the control computer, indicating that the cargo shipping reefer container signs out from the fault monitoring programme.

In some embodiments the sign-in signal comprises information that uniquely identifies the cargo shipping reefer container unit and an imminent or ongoing journey. This information may comprise a time stamp, a journey identifier and/or an order number. The sign-in signal may be issued by the control computer of a respective reefer container in response to the container being declared ready for a journey by a human user via the control panel of the respective reefer container.

In some embodiments the sign-in signal is used as an event to trigger collection of the preset values mentioned above.

In some embodiments the sign-in signal and the sign-out signal starts, respectively stops a process comprising the above-mentioned steps of: collecting preset values, from a database, that define operating conditions of the reefer container and/or properties of the reefer container and/or properties of the cargo; and then collecting the observation data from the control computer; inhibiting the cumulative value from cumulating until a predetermined criterion is reached; and then running the simulation model on observation data arriving from the control computer on an on-going basis.

In some embodiments the steps of collecting observation data, running the simulation model, computing a cumulative value and evaluating the cumulative value is performed on a container monitoring system; and wherein preset values for a specific journey are stored in a container booking system and transmitted there from to the container monitoring system.

The container monitoring system is configured to monitor and report on technical issues in respect of a container, whereas the container booking system is configured to configure a container with settings in dependence of its current booking e.g. the type of cargo it carries, its transport temperature etc. By interfacing the one system to the other such that preset values for a specific journey stored in a container booking system can be transmitted to the container monitoring system, there is provided an infrastructure that works efficiently for handling a very large number of cargo shipping reefer containers.

In some embodiments of the method a communications station communicates over a first wireless network with the control computer to receive the first and second set of observations; the communications station communicates with a server computer over a second wireless network to transmit the first and second set of observations to the server computer; and the running of the simulation model, the computing of residual values and the evaluation of the residual values is performed on the server computer.

In some embodiments a communications station is installed at a location where multiple containers are temporarily stowed e.g. on a container ship and the control computers of the reefer containers are in communication with the communications station e.g. via a wired or wireless network (e.g. a local telecommunications system). The communications station communicates in turn with a server computer via e.g. a satellite link. In this way the measured values are communicated to the server computer and the simulation model. The communications station operates in principle as a relay station forwarding the data it receives.

In some embodiments the alarm signal is reported via the communications station.

In some embodiments the alarm signal and/or other information signals from the server computer are addressed to a surveillance station localized with the communications station. The surveillance station is configured to receive alarm signals in respect of containers reporting via the communications station. Thus, a ship may have a surveillance station where alarms in respect of containers on board that ship are reported in a centralized manner. Thereby maintenance crew on board the ship can get an overview of the alarm situation at a centralized station.

In some embodiments multiple instances of a simulation model for respective cargo shipping containers are run on a server computer. Typically, a large number of containers are under surveillance by respective parallel processes each configured to perform the above method.

There is also provided A system comprising a server computer configured to perform the method of any of the preceding claims. In some embodiments the system is operated as a so-called cloud service wherein a farm of server computers are interfaced and mutually controlled to perform the method with computing and storage resources as needed. The system may be dynamically distributed at different data centres. In other embodiments the method is performed by hardware dedicated to performing the method.

BRIEF DESCRIPTION OF THE SEVERAL VIEWS OF THE DRAWINGS

An exemplary embodiment of the method and system will be described below with reference to the drawing, in which.

DETAILED DESCRIPTION OF THE INVENTION

Figure 1:
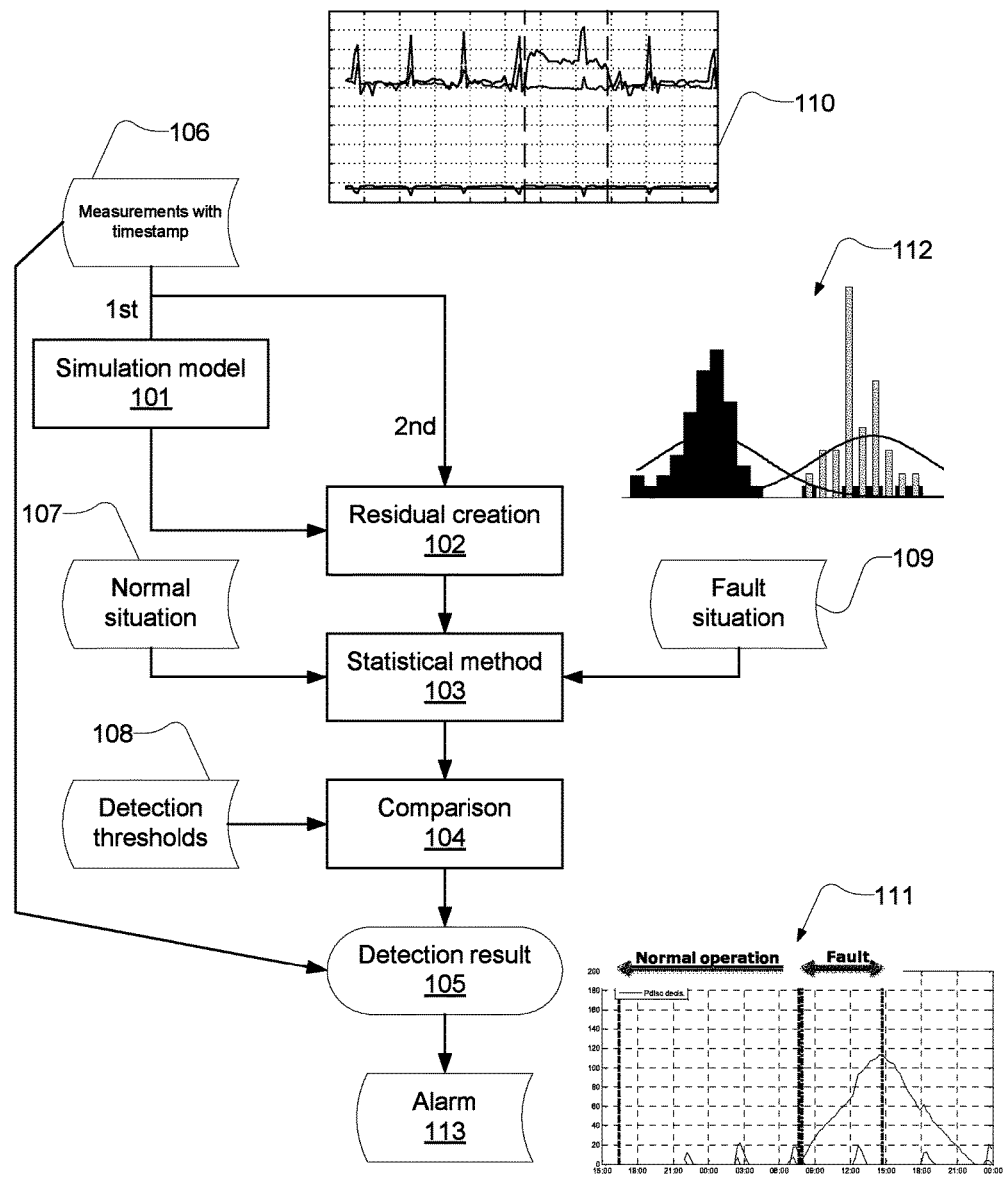
FIG. 1 shows an overview of the method of remotely monitoring a cargo shipping reefer container.

FIG. 1 shows a flowchart of the method of remotely monitoring a cargo shipping reefer container. The method is performed by a server computer configured to receive data 106 from remotely located reefer containers with respective control computers.

The method operates on received data 106 that comprises a first set of observation data and a second set of observation data with a respective first and second sequence of measurement values. As will be described in more detail below, the first and second sequence of measurement values comprise values measured either by sensors coupled to a communications device via a control computer of the reefer container or sensors coupled directly to a communications device.

The data 106 can be transmitted from the control computer to the server in various formats. In some embodiments each control computer embeds a group of measurement values (e.g. an ambient temperature value, a supply air temperature value, a return air temperature value, a suction pressure value, and a discharge pressure value) from the same or approximately the same point in time into a data packet that is given a time stamp corresponding to that point in time. In some embodiments the control computer performs processing of the measurement values before they are embedded into the data packet. Such processing may include filtering of the measurement values e.g. by a smoothening filter. In this case, the time stamp may represent the point in time of the most recent measurement sample input to the filter or another point in time. A sequence of measurement data may thus be transmitted in consecutive data packets e.g. a data packet transmitted at regular or semi-regular intervals e.g. every 20 minutes, every 30 minutes or every 60 minutes or at other intervals.

The simulation model 101 receives the first set of observation data as its input and outputs simulated values that are estimates of the second set of observations.

The output from the simulation model (i.e. the estimates of the second set of observations) and the second set of observations (i.e. the measured values) are input to a step 102 of computing residuals. The residuals are the differences between the values of the second set of observations and the values of the estimates of the second set of observations. The residuals comprise information about how well the estimates fit the measured values.

The simulation model 101 is configured to estimate the second set of observations under the condition that the refrigeration system operates in a normal operating condition. That is, the refrigeration system is free from significant performance degrading faults or impairment. Under this condition, the residuals may indicate that the estimates fit the measured values well.

When a deviation from the condition that the refrigeration system operates in a normal operating condition occurs, e.g. when a performance degrading fault occurs, the residuals indicate that the estimates fit the measured values less than well. Graph 110 shows four sequences of values as a function of time. At the bottommost of the graph 110 is shown a sequence of measured values of the second set of observations (e.g. a measured suction pressure $P_{suction}$ in a refrigeration circuit of the reefer container) and an estimate thereof as output from the simulation model. At the topmost, is shown a sequence of measured values of the second set of observations (e.g. a measured discharge pressure $P_{discharge}$ in the refrigeration system) and an estimate thereof as output from the simulation model. As can be seen in the time interval between the two vertical dashed lines, the estimate doesn't fit as well as it does at other times. This will show clearly in the residuals computed in step 102. The residuals are computed according to conventional methods known in the art.

The simulation model 101 receives the first set of observation data as its input and outputs simulated values that are estimates of the second set of observations. As mentioned above, the observation data comprises a respective first and second sequence of measurement values. The measurement values may result from measurements of ambient conditions and systems conditions. The ambient conditions may comprise the ambient temperature, ambient humidity, gas concentration (e.g. $O_2$ concentration), volume of fresh-air intake, and/or other ambient conditions. Ambient should be understood in the sense relative to the enclosure defined by the reefer container. The system conditions may comprise a supply air temperature, a return air temperature (see FIG. 5), a cargo temperature, a suction pressure in a refrigeration system, a discharge pressure in the refrigeration system and/or other system conditions.

The observation data may also comprise parameters that distinguish different types of reefer containers from one and another (e.g. a parameter that distinguish one type of refrigeration system from another and/or a parameter that distinguish one type of thermal insulation of a container from another). Typically such values are defined in a database of reefer containers. The database may be a part of a so-called booking system for booking a container for a particular trip or part of a so-called container management system.

The observation data may also comprise parameters in the form of cargo descriptor values that may specify thermal properties of the cargo. Cargo descriptor values may comprise values for specific heat of the cargo, respiratory heat of the cargo, commodity type, weight, volume and/or other cargo descriptor values. Such observation data are also designated initial conditions.

The observation data may also comprise parameters in the form of settings that define desired target values or ranges for a predefined physical property that the control computer of the refrigeration system is configured to reach and maintain. The predefined physical property may be a return air temperature and/or a humidity level and/or a concentration of gas and/or another property. Conventionally, such a setting is denoted a set-point, e.g. a set-point temperature.

In general the parameters in first set of observation data and the parameters in the second set of observation data are selected from the above-mentioned parameters in a mutually exclusive manner and such that the simulation model outputs estimates of observations in the second set such that respective residuals can be computed.

The simulation model may be a deterministic model based on first principles of thermodynamics or a statistical model. The simulation model implements expressions that express relations between parameters input to the model and its output. The simulation model may operate on values (also denoted samples) at a most current time instance and/or on values or samples one or more time instances back in time.

In an embodiment the simulation model has a first mode, which is a default mode and a second selectable mode. In the second mode, the simulation model operates on values at one or two sample point(s) in time and disregards operations on previous and future values. The second mode is also denoted a static model. The operations on previous values may comprise computation of derivatives with respect to time. In the first mode the simulation model operates on present and previous values comprising computing of derivatives with respect to time. The first mode is also designated a differential equation model or a transient model and is selected when the simulation model operates on data in a transient phase while the system operates to approach some target value e.g. a set point temperature. The second mode operates on two or more samples back in time. The second mode is selected when the system has settled around the target value. Once a range about a set-point is reached, after a transient phase, the second model is selected and output values there from computed. Once output values from the first and second model agree, the first model is deselected in the sense that computation of output values is stopped. This approach gives better estimation results and saves computational resources/power. Selection of modes is described further below in connection with FIG. 3.

A statistical method 103 is applied to process the residuals computed in step 102 and to compute an indicator value as a function of residual values. The indicator value may change its value over time and remain within a predefined range while the estimates output form the simulation model fit well with the measured values, whereas when the measurement values are significantly deviating from the estimates, the indicator value runs outside the predefined range.

The statistical method 103 operates on:
the residuals computed in step 102,
parameters 107 representing an expected distribution of the residuals in a normal operating condition, and
parameters 109, representing an expected distribution of the residuals in a fault condition.

This is illustrated in the graph 112, wherein the abscissa represents the magnitude of the residuals, and the ordinate represents the frequency of the residuals. The left hand side solid line represents the expected distribution of the residuals in a normal operating condition and the right hand side dashed line represents the expected distribution of the residuals in a faulty operating condition. The frequency of the residuals over a time period is represented as bars. For illustrative purposes the frequency of the residuals in a normal situation is shown by filled bars and the frequency of the residuals in a fault situation is shown by non-filled bars. It can be seen that residuals in a fault situation deviates and results in larger residuals. It can also be seen that residuals occasionally may be quite large even in a normal situation, cf. the filled bars to the right in the graph. The distribution of the residuals in normal and/or fault mode is estimated from historical observations under normal and faulty conditions.

The statistical method operates on the residuals computed in step 102 and the parameters 107 and 109 as described below, wherein a residual value is designated $x_m$ with subscript m designating a time index. The two functions $p_{Fault}(x_m)$ and $p_{Normal}(x_m)$ express the likelihood value for a given residual value $x_m$ given that the residual stems from a fault condition or a normal condition, respectively. For any residual value $x_m$ the value of $p_{Fault}(x_m)$ and $p_{Normal}(x_m)$ is computed. The ratio of the likelihood that the residual value stems from fault to the likelihood that the residual value stems from normal situation is computed. A high ratio indicates that a fault is more likely than a normal situation and vice versa.

The logarithmic value of the ratio is then computed at or for each time instance $x_m$. Thereby a value that is symmetric about the value zero is achieved; the logarithmic value of the ratio 1/1=0; the ratio 1/2=−0,693 and symmetrically: 2/1=+0,693.

The indicator value is computed by accumulating the computed logarithmic values over multiple time instances m. The accumulation starts at time instance j and ends at time instance M (capital M). The time instance M may represent a present point in time and time instance j, wherefrom the accumulation starts may represent a point in time when the statistical method was initialised e.g. by detection of a new trip for the reefer container. In this way non-fault conditions which may appear like fault conditions e.g. during loading of the reefer container or during a transient phase following shortly thereafter can be disregarded in the computation of the indicator value.

In a formal representation the statistical model is expressed below:

$$S_m(j) = \sum_{m=j}^{M} \ln\left(\frac{p_{Fault}(x_{m'})}{p_{Normal}(x_{m'})}\right)$$

Wherein $S_m(j)$ is the indicator value as a function of indexes m and j. The variables and functions are explained in the above.

In some embodiments, negative values of $S_m(j)$ are discounted in the event the probability of a normal situation prevails over the probability of fault situation, such that:

$$S_m(j) = \begin{cases} S_m(j) > 0: & S_m(j) \\ S_m(j) \leq 0: & 0 \end{cases}$$

Thereby the indicator value doesn't run away over long periods of normal operation. This computation is also denoted a recursive likelihood ratio method.

The indicator value is subject to comparison against a detection threshold value 108 in step 104. The level of the detection threshold may be decided on by a heuristic of possible or most likely faults. The level of the detection threshold may be adapted such that the threshold is not exceeded when shorter periods of fault-like residuals occur i.e. the indicator value increases over multiple time instances. However, unless such shorter periods are followed by periods where the indicator value decreases, the threshold may be exceeded after some time.

It should be emphasized that the simulation model 101 may output estimates of multiple measurements e.g. 1) supply temperature, 2) return temperature, 3) suction pressure and 4) discharge pressure. Therefore, respective residuals are computed that can be processed individually by the statistical method to give respective indicator values. In some embodiments two or more residuals e.g. suction pressure and discharge pressure residuals are combined e.g. by addition or linear combination into a combined residual. Such a combined residual may be input to the statistical model. Thereby it is possible to tune the residual computation to have a desired sensitivity to particular fault conditions and to reduce the probability of erroneous fault detections.

The graph 111 illustrates how a first and second indicator value depicted along the ordinate axis may develop over time instances depicted along the abscissa axis. A first indicator value develops over time with peaks, but it reverts to zero or close to zero after each peak. A second indicator value develops over time with lower peaks, but it starts to increase at a point in time and rises far above the smaller peaks. A threshold above the smaller peaks may capture this so that an alarm can be raised. When the fault is identified by the alarm signal and the cause has been removed (e.g. by mending the refrigeration system or a component thereof) the indicator value decreases again since the probability that the residuals stem from a normal situation predominates.

In step 105 a result of evaluating the indicator value is determined. The result may be that an alarm 113 is issued in case the threshold is exceeded. The alarm 113 may indicate the time instance at which the threshold was exceeded. Step 105 may comprise evaluation of multiple indicator values. The evaluation may be individually performed with respective individual detection thresholds 108 or the evaluation may involve the combination of the multiple indicator values e.g. by a weighted combination.

The alarm may comprise or be associated with values of a sequence of measurement values measured by sensors coupled to the control computer. The values may serve to document how the measurement values developed before and optionally after the alarm was issued. The values may comprise all or substantially all values from the respective trip of the respective reefer container or it may comprise a shorter trail of values leading to the alarm. In case of multiple indicator values, the alarm may indicate the indicator value exceeding its respective threshold.

Also, in case an alarm is not issued in respect of a trip, a report may be provided with values of a sequence of measurement values measured by sensors coupled to the control computer or other hardware device to document that the goods or produce was transported in a reefer container without faults.

Figure 2A:
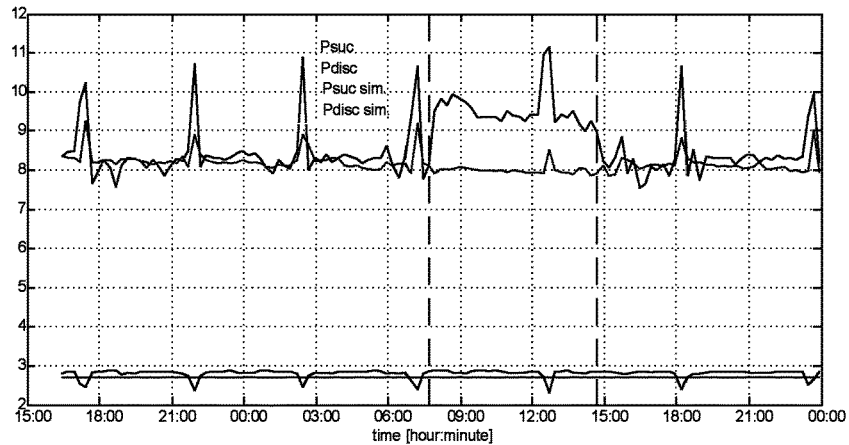
FIGS. 2a, 2b and 2c show the graphs of FIG. 1 in greater detail.
Figure 2B:
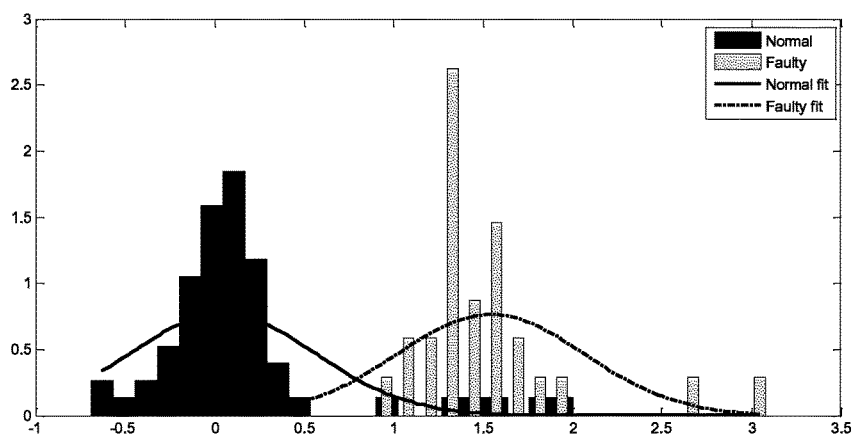
Figure 2C:
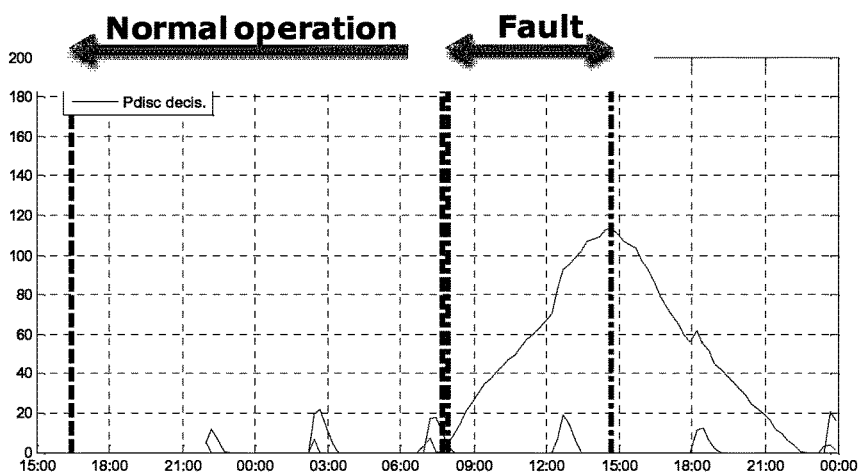

FIGS. 2a, 2b and 2c show the graphs of FIG. 1 in greater detail. FIG. 2a shows graph 110 with four sequences of values as a function of time. At the bottom of the graph 110 is shown a sequence of measured values of the second set of observations (e.g. a measured suction pressure $P_{suction}$) and an estimate thereof as output from the simulation model. At the topmost, is shown a sequence of measured values of the second set of observations (e.g. a measured discharge pressure $P_{discharge}$) and an estimate thereof as output from the simulation model. As can be seen in the time interval between the two vertical dashed lines, the estimate doesn't fit as well as it does at other time instances. This will show clearly in the residuals computed in step 102.

It can also be seen that the pairs of measured and simulated values in general tend to deviate from each other, however the statistical model suppresses such deviations and prevents them from raising an alarm, unless the deviation is significant and consistent over time.

FIG. 2b shows the graph 112, wherein the abscissa represents the magnitude of the residuals, and the ordinate represents the frequency of the residuals. The left hand side solid line represents the expected distribution of the residuals in a normal operating condition and the right hand side dashed line represents the expected distribution of the residuals in a faulty operating condition. The frequency of the residuals over a time period is represented as bars. For illustrative purposes the frequency of the residuals in a normal situation is shown by filled bars and the frequency of the residuals in a fault situation is shown by non-filled bars. It can be seen that residuals in a fault situation deviates and results in larger residuals. It can also be seen that residuals occasionally may be quite large even in a normal situation, cf. the filled bars to the right in the graph.

FIG. 2c shows the graph 111 which illustrates how a first and second indicator value depicted along the ordinate axis may develop over time instances depicted along the abscissa axis. A first indicator value develops over time with peaks, but it reverts to zero or close to zero after each peak. A second indicator value develops over time with lower peaks, but it starts to increase at a point in time and rises far above the smaller peaks. A threshold above the smaller peaks may capture this so that an alarm can be raised. When the fault is identified by the alarm signal and the cause has been removed (e.g. by mending the refrigeration system or a component thereof) the indicator value decreases again since the probability that the residuals stem from a normal situation predominates. The threshold level is not shown, but may e.g. be located at the value of 100 on the ordinate axis or at another value e.g. the value 80 or 110 or 120. Where in the latter example of 120 the indicator value would not have caused an alarm since the value of 120 was not reached.

Thus, it is illustrated how the statistical model suppresses inconsistent deviations and prevents them from raising an alarm, whereas a significant deviation that lasts eventually may raise an alarm.

Figure 3:
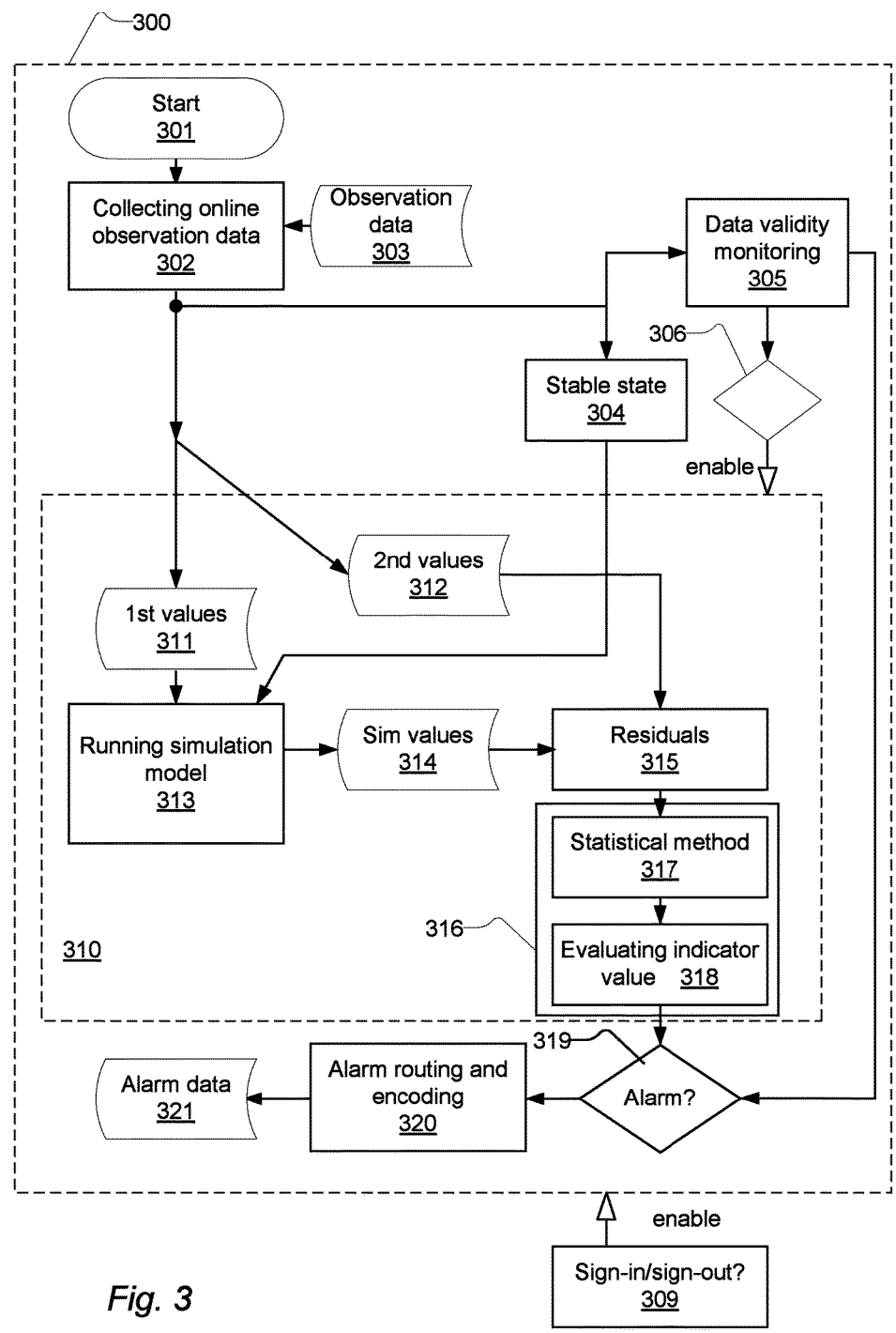
FIG. 3 shows a flowchart of the method of remotely monitoring a cargo shipping reefer container.

FIG. 3 shows a flowchart of the method of remotely monitoring a cargo shipping reefer container. The method is performed by a server computer receiving data transmissions from data communication units in remotely located reefer containers. A dashed line box 300 indicates an instance of the method performed in respect of a respective reefer container. The server performs several such instances concurrently for respective reefer containers.

The method starts in step 301. This start may be initiated when online observation data 303 begins to arrive from the communication unit of a reefer container or when the communication unit transmits a predefined signal indicating that the control computer is online or a predefined signal issued when the respective reefer container is declared ready by an operator. Observation data may comprise measurement values and in some embodiments initial values and/or presets.

The online observation data are collected in step 302 comprising collecting online measurement data from the sensors of the reefer container via the communication unit. The online measurement data or observation data 303 may be received in data packets comprising multiple measurement values of respective parameters sampled at the substantially same time instance. The data packets are transmitted at regular time intervals, but occasionally they may be transmitted at irregular time intervals. Especially, data packets may arrive at the server at irregular time intervals due to irregular delays on the transmission network over which the data packets are transmitted. Also, data packets may arrive at the server at irregular time intervals and/or with significant delays if the communication unit (i.e. a reefer container) is out of communication range of the communication network. The communication unit is provided with a buffer memory to temporarily store measurement data and transmit them once the communication unit is within communication range of the communication network. The multiple measurement values of the same data packet may be from the same time instance. The data packet and/or the measurement values may be given a timestamp. This allows the server to sort out irregularities or reverse orders of the data packets and bring the measurement values in a correct order.

The received online data 303 are processed in step 304 and step 305 which performs a stable state detection and data validity detection, respectively.

The stable state detection in step 304 processes a sequence of measurement values to estimate a level of the measurement values and/or a change in level and then it compares the estimated level and/or change in level to a predetermined criterion. The stable state detector operates on selected ones of the measured parameters e.g. the supply air temperature ($T_{supply}$) and/or the return air temperature ($T_{return}$). The stable state detector may estimate a level of the values based on individual values or an average e.g. a weighted average of the values. The predetermined criterion may be that the estimated level is within a predefined range e.g. a temperature range of 0.1 to 3 degrees. The predefined range may also or alternatively be determined from collected preset values for an upcoming trip. For instance, in case a preset value specifies a set-point temperature of minus 15 degrees the criterion may be determined to be within a predefined range about the set-point temperature e.g. plus/minus 2 degrees abound the set-point. Thus when return air temperature for one or more consecutive time instances is within this range, given by the predefined criterion, the stable state detector gives an output indicating that a stable state has been reached.

Several such stable state detectors may operate in parallel and their output may be combined by an 'and-operation' such that when all parameters have reached stable values the combined output indicates that a stable state has been reached.

In a similar way the stable state detector may estimate a change in level by computing an estimated gradient or quotient for the measured value. A stable state may be detected when e.g. the return air temperature consistently decreases. The predefined criterion may be that the estimated gradient is decreasing by 0.1 degree C. per minute or decreases within a predefined range thereof. The predefined criterion may be determined from preset values e.g. comprising values specifying the type of the refrigeration unit with the reefer container or the reefer unit itself.

In some embodiments the estimated level and estimated change in level is combined to detect a stable state when the following condition is satisfied: the supply air temperature ($T_{supply}$) is within a predetermined range and the return air temperature ($T_{return}$) is approaching a set point temperature.

The output of the stable state detector 304 is used to control the running of simulation model in step 313. In some embodiments the output from the stable state detection 304 selects either the first mode or the second mode of the simulation model. The first mode is selected when stable state detection shows a transient phase and the second mode is selected when the stable state detection shows a stable state.

Thus, the stable state detector 304 gives an output discriminating between two situations:
1) a state where one or more of the measured values are maintained at a stable level or where one or more of them are progressing towards a stable level; and
2) a state where one or more of the measured values are fluctuating outside or exceed predefined ranges, or fails to converge sufficiently towards a set-point.

The second situation (2) is also designated an obvious deviation situation and the first situation (1) is designated a controlled situation. In some embodiments the measured value is or comprises the controlled temperature.

Data validity monitoring is performed in step 305. Data validity monitoring may be performed in a similar way as a stable state is detected. That is, by processing a sequence of measurement values to estimate a level of the measurement values and/or a change in level; and comparing the estimated level and/or change in level to a predetermined criterion. In some embodiments the stable state detection and the data validity monitoring shares some data processing algorithms.

In response to the performed data validity monitoring in step 305 and in dependence of the results thereof an enable signal is provided in step 306. The enable signal may enable or disable running of the simulation model, computation of the indicator value, running of the statistical model. These functions are represented by dashed line box 310. Further, in some embodiments the step of data validity monitoring controls whether to issue an alarm signal via step 319.

Data validity monitoring is performed also to capture events where measurement values deviates significantly from a range which defines a normal operating condition in a wide sense. Thus pre-filtering may capture obvious faults, which the statistical model in unfortunate events may not capture. Thus in case the predefined criterion of the data validity monitoring is exceeded, an alarm signal may be issued irrespective of the result of evaluating the residuals by means of the statistical model.

The data validity monitoring comprises:
detecting missing data packets among the data packets from a control computer of a respective reefer container; and/or
detecting illegal values; and/or
detecting obvious deviation situation.

Detecting missing data packets among the data packets from a control computer of a respective reefer container comprises examining time stamps or sequence numbers of data packets prior to missing data packets being observed and of data packets arriving at a later point in time. At the later point in time it may be determined that:
1) the sequence is continued with all data packets received;
2) the sequence has missing data packets since packets with expected time stamps or sequence numbers are missing.

The latter situation indicates missing data packets. In some embodiments data validity monitoring comprises detecting whether predefined measurements are missing in a data packet. The predefined measurements may be any measurement or measurements that are defined to be essential for the computations in connection with the simulation model.

Detecting illegal values comprises deciding whether observation data falls outside a predefined range of so-called valid data as defined for a respective sensor and/or reefer container. For instance is a sensor configured to output temperature values in the range −70 degrees Celsius to +70 degrees Celsius (i.e. the range of valid data) outputs a value of −128 it can be considered an illegal value.

Detecting an obvious deviation situation comprises discriminating between the two situations as described in connection with the stable state detector 304.

The step of performing data validity monitoring comprises outputting a code indicative of missing data packets or illegal values or obvious deviation situation or none of those as the case may be. A set of such codes enables simulation via step 306 and an enable signal, whereas another set of such codes disables simulation via step 306.

Reverting to processing of the online measurement data: The collection of online measurement data 303 and presets 308 are split into first values 311 and second values 312. The first values 311 are input to the simulation model being run in step 313. Simulated values 314 output from the simulation are input to step 315 together with the second values 312 for computing residual values. The residual values are computed as the difference, for a respective parameter, between the measured value of the parameter and the simulated value of the parameter. As mentioned above, the residuals can be computed e.g. by addition or linear combination into a combined residual.

The residuals are processed in step 316 by means of a statistical method performed in step 317 and an evaluation step 318. This is described in more detail in connection with FIG. 1. Based on the evaluation in step 318 it is decided in step 319 whether to issued an alarm signal. In the positive event thereof information relating to the alarm is collected and encoded as alarm data 321, and the alarm is routed to a predetermine destination in step 320. Further, the codes output from the step of performing data validity monitoring may raise an alarm via step 319. A predefined set of the codes raises an alarm.

In some embodiments the method performs a smoothening filter operation on the first sequence of measurement values prior to being input for the simulation model. The smoothening filter operation may be performed on the $1^{st}$ and/or $2^{nd}$ values at a server computer. Alternatively, the smoothening filter operation is performed at the control computer installed with a respective reefer container. In the latter situation, data are smoothed before transmission to the server. The control computer may obtain measurement values from sensors connected to it at a sample rate, perform the smoothening operation and then reduce the sample rate before transmission to the server. In this way the amount of data to be transmitted can be reduced. In some embodiments a smoothening filter operation is performed on the residuals output from step 315.

In some embodiments the method is configured with a step of detecting arrival or reception of measurement data. Once measurement data arrives the method processes these measurement data, residuals are computed and the statistical model is run. Thereby the method runs and computes simulated data whenever data arrives.

In some embodiments the running of an instance of the method performed in respect of a reefer container as indicated by dashed line box 300 may be enabled or disabled by a master signal received or obtained from a booking system or other container management system. The master signal is received in step 309 wherein it is decided to whether to sign the container in to be a subject for running an instance of the method or not. Alternatively the master signal may be transmitted from a control computer of the respective reefer container.

Figure 4:
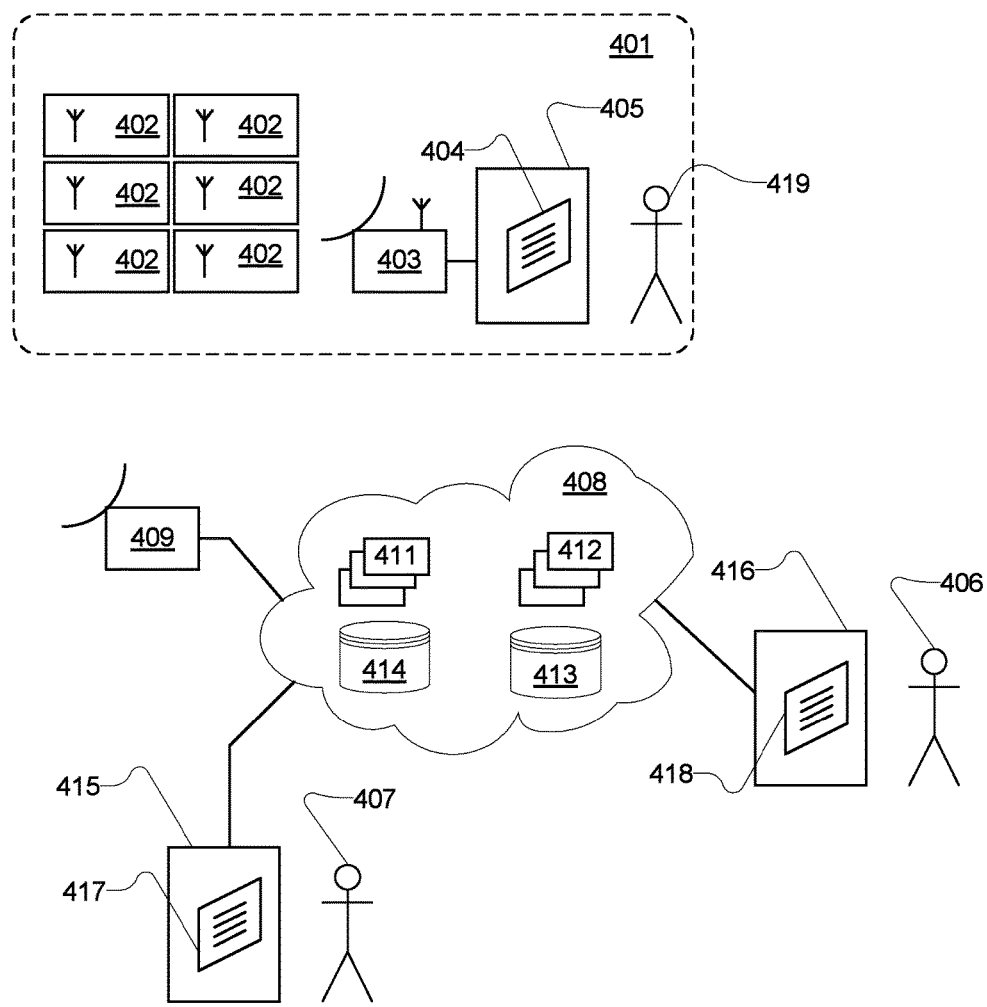
FIG. 4 shows the infrastructure the system.

FIG. 4 shows the infrastructure a system. The server computer or simply the server may be implemented in various ways e.g. with dedicated server hardware or as a cloud-based service. The server is in general designated 408. The server runs multiple instances 411 of the method as described above and store data related thereto in a database 414. The server is in communication with a communications station 409. The communications station 409 may establish a satellite communications link with one or more remotely located communications stations 403. Via this satellite communications link data packets can be communicated. The remotely located communications station 403 may be installed on a container vessel on a freight train or other locality 401.

The remotely located communications station 403 communicates via a local communications link with control computers of a collection of reefer containers 402. The local communications link may be a wired communications link e.g. communicating over an electrical power supply line supplying electrical power to the reefer containers. Alternatively, the local communications link is a wireless communications network e.g. a telecommunications system such as the GSM system or another wireless system. The remotely located communications station 403 thereby serves as a communications hub for the communication between the server 408 and the reefer containers in the locality 401. The communications station 403 may also provide a connection with a local computer 405 operated by a local user 419. The local computer may receive reports 404 with alarms and other information for respective reefer containers received from the server 408.

The server may also be coupled to a computer 415 and receive reports 417 with alarms and other information for respective reefer containers received from the server 408. The reports 417 may contain information comprising alarms from multiple localities 401 e.g. multiple container vessels. The reports 417 may provide a centralized overview of the alarms for a larger collection of reefer containers.

The server running multiple instances of the method designated 411 may communicate with a container booking system 412 with a respective database 413. The container booking system performs a method providing a user 406 with computer services enabling the user 406 to book a reefer container with predefined properties for a specified trip and to specify the goods to be transported and the climate conditions to be maintained by the refrigeration system in the reefer container's storage space. The specification of these properties are given by the user and/or determined automatically by the booking system. The values of these properties may be communicated to a container monitoring system such that it can be included in the computations performed by the method 411.

The booking system is sometimes designated a container management system. A reefer container may be configured with a GPS receiver in communication with its control computer. Thereby GPS co-ordinates of the reefer container can be transmitted to the server computer 408. Thereby the server computer can run an asset tracking programme.

Communication between a reefer container 402 and the server computer 408 may take place via a public GSM network once a reefer container is within range of the GSM network. Thereby communication via a satellite link can be bypassed.

Figure 5:
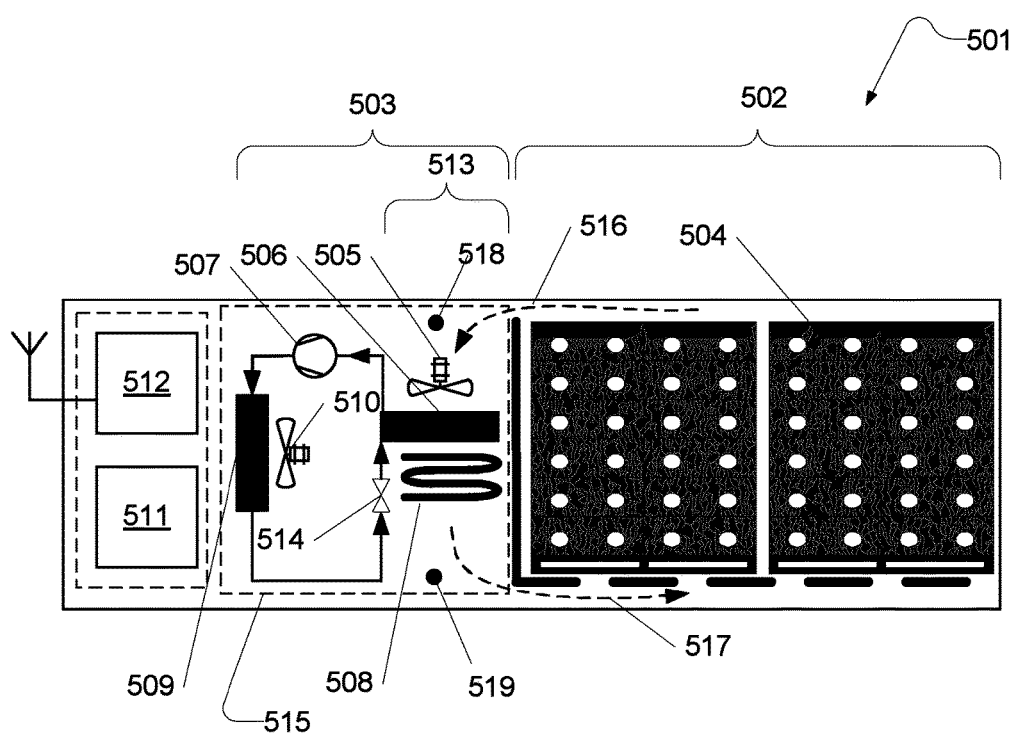
FIG. 5 shows an exemplary cargo shipping reefer container in a simplified cross-sectional view.

FIG. 5 shows an exemplary cargo shipping reefer container in a simplified cross-sectional view.

A load or cargo section 502 of the refrigerated transport container 501 comprises a commodity load e.g. comprising a plurality of stackable transport boxes 504 arranged within the cargo section 502 such as to leave appropriate clearance at a ceiling and a floor structure for air flow passages above and beneath the commodity load. In this example a so-called vapour compression refrigeration cycle as known in the art is used.

The refrigeration system comprises a refrigeration circuit 515 and a cooling space 513. The refrigeration circuit comprises a compressor 507, a condenser 509, an expansion device 514 and an evaporator 506. The compressor 507 and the condenser 509 are typically situated outside an insulated enclosure of the transport container 501. Usually the condenser 509 is an air-cooled condenser with one or more condenser fans 510 routing air in heat transfer relation with the condenser in order to eject heat from the condenser to its environment.

The cooling space 513 is situated inside the insulated enclosure of the transport container 501. The cooling space 513 is normally separated from the transport volume 502 by a panel equipped with one or more openings to allow a return air flow 516 from the transport volume 502 into the cooling space 513 and a supply air flow 517 out of the cooling space 513 into the transport volume 502. The air flow through the cooling space is maintained by one or more evaporator fans 505. On its way through the cooling space, air successively passes a return air temperature sensor 518, the one or more evaporator fans 505, the evaporator 506, a heating unit 508, and a supply air temperature sensor 519.

The heating unit 508 may e.g. be an electric heater or a reheat air coil. Usually an electric heater is simply an electrical resistor and works on the principle of Joule heating, i.e. an electric current through a resistor converts electrical energy into heat. Usually a reheat air coil is a heat exchanger connected to the refrigeration circuit with controllable valves in such a way that hot pressurized refrigerant, exiting the compressor, can be directed through the heat exchanger when heating is demanded.

During the so-called vapour compression refrigeration cycle the compressor 507 sucks refrigerant vapour (at a suction pressure, $P_{suction}$) from the evaporator and compresses the refrigerant vapour which subsequently flows to the condenser at high pressure. The condenser ejects its heat to a medium (air) outside the refrigerated transport container while condensing the refrigerant vapour. The liquefied refrigerant then flows to the expansion device in which a refrigerant pressure drops to a discharge pressure ($P_{discharge}$). The low pressure refrigerant then flows to the evaporator 506 where the refrigerant evaporates while extracting the required heat from the refrigerated transport container.

Although not shown, pressure sensors are installed in the refrigeration system to measure the suction pressure and the discharge pressure.

The temperature sensors and the pressure sensors communicate with a control computer 511. Communication between the sensors and the control computer is performed via a wired or wireless connection. The control computer controls the components of the refrigeration system e.g. the fans 510 and 505, the heater 508 and the compressor 507 as it is known in the prior art.

The control computer may comprise a communications unit 512 for communicating with the local communications station 403. The communications unit 512 may be a separate unit where the control computer and/or the communications unit is/are adapted to communicate the measurement values from the sensors via the control computer 511 and the communications unit 512 to the local communications station 403 and then to the server 408.

The embodiment described above is expedient since the control computer and sensors communicating with the control computer are installed in many conventional reefer containers, where the control computer controls operation of the refrigeration system. Thus, by interfacing with the control computer to retrieve measured data, a further set of sensors with respective wiring can be avoided.

In alternative embodiments the control computer and the communications unit are integrated in a single unit.

In some embodiments the control computer is configured as a data acquisition system that interfaces with the sensors and a modem also designated a communications unit.

In some embodiments the control computer and the sensors communicating with it operate as a first system and a remote-monitoring computer coupled to further sensors, such as temperature and pressure sensors, and coupled to the communications unit operate as a second system. In some embodiments the first and the second system operate as separate systems. Thereby remote monitoring of the reefer container is implemented by means of a system separate from a conventional control computer system. Other structures of the hardware system(s) implementing the claimed method can be envisioned without departing from the claimed scope.

The method may also be performed completely or partially on a local computer installed with a reefer container.

The invention claimed is:

1. A computer-implemented method of remotely monitoring the operation of a cargo shipping reefer container configured with a refrigeration system that has installed therewith a control computer coupled with sensors monitoring the operation of the refrigeration system, the method comprising:
    collecting, from the control computer, a first set of observation data and a second set of observation data comprising a respective first and second sequence of measurement values measured by sensors coupled to the control computer;
    collecting preset values, from a database, that define settings for a cargo property value that defines thermodynamic properties of the cargo;
    running a simulation model that receives the first set of observation data and the preset values as input and outputs simulated values, wherein the simulation model is configured to output the simulated values as estimates of the second set of the observation data;
    computing an indicator value as a function of residual values computed from the difference between the values of the second set of observation data and the simulated values;
    evaluating the indicator value against a predefined criterion and issuing an alarm signal in case the predefined criterion is exceeded;
    processing a sequence of measurement values to estimate at least one of a level of the measurement values and a change in level;
    comparing the at least one estimated level and change in level to a predetermined criterion;
    issuing an alarm signal in case the predetermined criterion is exceeded; and
    updating a condition of the cargo shipping reefer container in a database for scheduling maintenance of the cargo shipping reefer container based on the alarm signal.

2. The method according to claim 1, wherein computing of the indicator value comprises computing a cumulative value of the residuals.

3. The method according to claim 1, wherein the preset values further defines settings for at least one of the refrigeration system of the reefer container and features of the reefer container and cargo property values.

4. The method according to claim 3, wherein the preset values that are input to the simulation model further comprise:
    a preset temperature value that defines a temperature the refrigeration system is set to obtain for the cargo; and
    a cargo property value that defines thermo-dynamic properties of the cargo.

5. The method according to claim 1, wherein the first set of observation data that is collected from the control computer and input to the simulation model comprises at least one of:

a measured temperature value that is an estimate of an ambient temperature for the cargo shipping reefer container; and a measured volume that is an estimate of the volume of fresh air intake for the cargo shipping reefer container.

6. The method according to claim 1, wherein the second set of observation data that is collected from the control computer and compared to output of the simulation model comprises:

a first temperature value and a second temperature value that are measured in an air flow flowing through an evaporator of the refrigeration system.

7. The method according to claim 1, wherein the second set of observation data that is collected from the control computer and compared to output of the simulation model comprises:

a first pressure value and a second pressure value that are measured with respect to a compressor in the refrigeration system.

8. The method according to claim 1, comprising:

performing a smoothening filter operation on the first sequence of measurement values prior to being input for the simulation model.

9. The method according to claim 1, wherein the simulation model has a first mode, which is a default mode and a second selectable mode, the method further comprising:

selecting the second mode when the predetermined criterion is exceeded.

10. The method according to claim 1, comprising:

preparing the simulation model for an ensuing period of simulation in response to detection of an ensuing trip of the reefer container, wherein an ensuing trip of the reefer container is detected as a pause of a predetermined length within which observation data from the respective reefer container has not been received followed by further observation data.

11. The method according to claim 1, comprising:

processing a sequence of measurement values to estimate a level of the measurement values and/or a change in level;

comparing the estimated level and/or change in level to a predetermined criterion; and disabling issuing of the alarm signal while the predetermined criterion is exceeded.

12. The method according to claim 1, comprising:

receiving a sign-in signal, from the control computer, indicating that the cargo shipping reefer container signs in to a fault monitoring program, receiving a sign-out signal, from the control computer, indicating that the cargo shipping reefer container signs out from the fault monitoring program.

13. The method according to claim 1, wherein the steps of collecting observation data, running the simulation model, computing a cumulative value and evaluating the cumulative value are performed on a container monitoring system; and wherein preset values for a specific journey are stored in a container booking system and transmitted to the container monitoring system.

14. The method according to claim 1, wherein a communications station communicates over a first wireless network with the control computer to receive the first and second set of observations;

wherein the communications station communicates with a server computer over a second wireless network to transmit the first and second set of observations to the server computer; and wherein the running of the simulation model, the computing of residual values and the evaluation of the residual values is performed on the server computer.

15. The method according to claim 14, wherein the alarm signal is reported via the communications station.

16. The method according to claim 1, wherein multiple instances of a simulation model for respective cargo shipping containers are run on a server computer.

17. A system comprising a server computer configured to perform the method of claim 1.

18. A computer-readable medium encoded with a program to perform the method of claim 1 when run on a computer system.

19. A computer-implemented method of remotely monitoring the operation of a cargo shipping reefer container configured with a refrigeration system that has installed therewith a control computer coupled with sensors monitoring the operation of the refrigeration system, the method comprising:

collecting, from the control computer, a first set of observation data and a second set of observation data comprising a respective first and second sequence of measurement values measured by sensors coupled to the control computer;

collecting preset values, from a database, that define settings for a cargo property value that defines thermodynamic properties of the cargo;

running a simulation model that receives the first set of observation data and the preset values as input and outputs simulated values, wherein the simulation model is configured to output the simulated values as estimates of the second set of the observation data, further wherein the simulation model has a first mode being a default mode and a second selectable mode;

computing an indicator value as a function of residual values computed from the difference between the values of the second set of observation data and the simulated values;

evaluating the indicator value against a predefined criterion and issuing an alarm signal in case the predefined criterion is exceeded;

processing a sequence of measurement values to estimate at least one of a level of the measurement values and a change in level;

comparing the at least one estimated level and change in level to a predetermined criterion; and selecting the second selectable mode when the predetermined criterion is exceeded.

20. A computer-implemented method of remotely monitoring the operation of a cargo shipping reefer container configured with a refrigeration system that has installed therewith a control computer coupled with sensors monitoring the operation of the refrigeration system, the method comprising:

collecting, from the control computer, a first set of observation data and a second set of observation data comprising a respective first and second sequence of measurement values measured by sensors coupled to the control computer;

collecting preset values, from a database, that define settings for a cargo property value that defines thermodynamic properties of the cargo;

running a simulation model that receives the first set of observation data and the preset values as input and outputs simulated values, wherein the simulation model is configured to output the simulated values as estimates of the second set of the observation data;

computing an indicator value as a function of residual values computed from the difference between the values of the second set of observation data and the simulated values;

evaluating the indicator value against a predefined criterion and issuing an alarm signal in case the predefined criterion is exceeded; and preparing the simulation model for an ensuing period of simulation in response to detection of an ensuing trip of the reefer container, wherein the ensuing trip of the reefer container is detected as a pause of a predetermined length within which observation data from the respective reefer container has not been received followed by further observation data.

* * * * *